US009232281B2

(12) United States Patent
Kurata et al.

(10) Patent No.: US 9,232,281 B2
(45) Date of Patent: Jan. 5, 2016

(54) COMMUNICATION MANAGEMENT APPARATUS, TERMINAL, COMMUNICATION MANAGEMENT SYSTEM, COMMUNICATION MANAGEMENT METHOD, PROGRAM, AND INFORMATION STORAGE MEDIUM

(71) Applicant: Sony Computer Entertainment Inc., Tokyo (JP)

(72) Inventors: Daisuke Kurata, Kanagawa (JP); Shunichi Soma, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/477,956

(22) Filed: Sep. 5, 2014

(65) Prior Publication Data
US 2015/0089563 A1 Mar. 26, 2015

(30) Foreign Application Priority Data
Sep. 24, 2013 (JP) .................................. 2013-196950

(51) Int. Cl.
*H04N 7/173* (2011.01)
*H04N 21/488* (2011.01)
*H04N 21/41* (2011.01)
*H04N 21/414* (2011.01)
*H04N 21/443* (2011.01)
*H04N 21/462* (2011.01)
*H04N 21/4722* (2011.01)
*A63F 13/26* (2014.01)
(Continued)

(52) U.S. Cl.
CPC ............ *H04N 21/4884* (2013.01); *A63F 13/26* (2014.09); *A63F 13/71* (2014.09); *A63F 13/73* (2014.09); *A63F 13/92* (2014.09); *H04N 21/4122* (2013.01); *H04N 21/41407* (2013.01); *H04N 21/4436* (2013.01); *H04N 21/4622* (2013.01); *H04N 21/4722* (2013.01)

(58) Field of Classification Search
CPC .................. H04N 21/41407; H04N 21/43615; H04N 21/4622; H04N 21/6125; H04N 21/43637; H04N 5/4403; H04N 21/4126
USPC ........... 725/112, 114, 117, 119, 120; 348/734
See application file for complete search history.

(56) References Cited

U.S. PATENT DOCUMENTS

2010/0031286 A1* 2/2010 Gupta et al. .................... 725/38
2010/0135279 A1* 6/2010 Petersson et al. ............. 370/352
(Continued)

FOREIGN PATENT DOCUMENTS

JP 2000172654 A 6/2000
JP 2005012655 A 1/2005
(Continued)

OTHER PUBLICATIONS

Office Action for corresponding JP Patent Application No. 2013-196950, dated Jul. 21, 2015.

*Primary Examiner* — Oleg Asanbayev
(74) *Attorney, Agent, or Firm* — Matthew B. Dernier, Esq.

(57) ABSTRACT

A communication management apparatus is provided which includes: a start request acceptance unit configured to accept a request to start a program from a terminal; a query unit configured to query the program whether communication with the terminal is available upon acceptance of the start request; and a response transmission unit configured to transmit to the terminal, in response to the start request therefrom, a message indicating whether communication is available between the program and the terminal as a result of the query about the availability of communication therebetween.

7 Claims, 8 Drawing Sheets

(51) Int. Cl.
*A63F 13/92* (2014.01)
*A63F 13/73* (2014.01)
*A63F 13/71* (2014.01)

(56) References Cited

U.S. PATENT DOCUMENTS

2011/0145581 A1* 6/2011 Malhotra et al. .............. 713/171
2014/0068687 A1* 3/2014 Greenberg et al. ............ 725/93

FOREIGN PATENT DOCUMENTS

| JP | 2007200209 A | 8/2007 |
| JP | 2012019413 A | 1/2012 |
| JP | 2012226762 A | 11/2012 |
| JP | 2013143154 A | 7/2013 |

* cited by examiner

F I G . 4
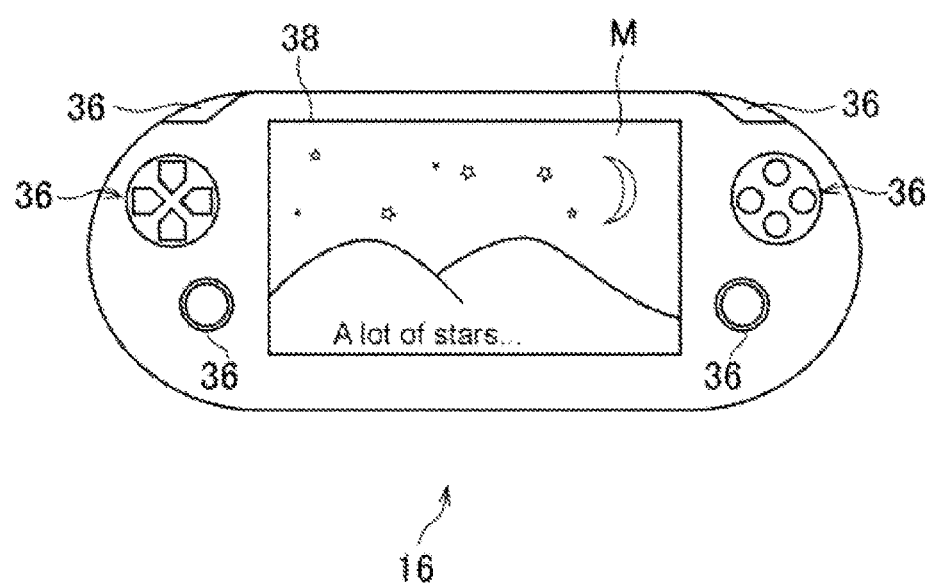

FIG. 7

| IS COMMUNICATION WITH INFORMATION PROCESSING TERMINAL 16 AVAILABLE? | IS TARGET PROCESS GENERATED UPON ACCEPTANCE OF START REQUEST? | RESULT OF QUERY (SEE (C) IN FIG. 6) | MESSAGE (SEE (D) IN FIG. 6) |
|---|---|---|---|
| AVAILABLE | yes | (a) THAT COMMUNICATION WITH INFORMATION PROCESSING TERMINAL 16 IS AVAILABLE, TOGETHER WITH PORT NO. USED BY TARGET PROCESS | (c1) A MESSAGE INDICATING THAT COMMUNICATION IS AVAILABLE WITH INFORMATION PROCESSING TERMINAL 16 RELATED TO PORT NO. (THIS MESSAGE INDICATES THAT TARGET PROCESS IS GENERATED.) |
| | no | | (c2) A MESSAGE INDICATING THAT COMMUNICATION IS AVAILABLE WITH INFORMATION PROCESSING TERMINAL 16 RELATED TO PORT NO. (THIS MESSAGE INDICATES THAT TARGET PROCESS HAS ALREADY BEEN GENERATED.) |
| NOT AVAILABLE | — | (b) THAT COMMUNICATION WITH INFORMATION PROCESSING TERMINAL 16 IS NOT AVAILABLE | (d) A MESSAGE INDICATING THAT COMMUNICATION IS NOT AVAILABLE WITH INFORMATION PROCESSING TERMINAL 16 | ns
COMMUNICATION MANAGEMENT APPARATUS, TERMINAL, COMMUNICATION MANAGEMENT SYSTEM, COMMUNICATION MANAGEMENT METHOD, PROGRAM, AND INFORMATION STORAGE MEDIUM

BACKGROUND

The present disclosure relates to a communication management apparatus, a terminal, a communication management system, a communication management method, a program, and an information storage medium.

There exist programs capable of communicating with one or a plurality of terminals, the programs including a game program allowing a plurality of players to play the game using different terminals, and a program for reproducing moving images in response to requests received from terminals.

Where these programs are installed in a server, there is technology that allows terminals to start the programs on a remote basis. According to this technology, upon acceptance of a request to start a program from a terminal, the server transmits to the terminal a message indicating whether or not the program can be started as a response to the start request. For example, after the attempt to start the program of interest has succeeded or failed, a message indicating the success or the failure is transmitted. If the program in question has already been started upon acceptance of the request to start that program, a message to that effect is transmitted.

SUMMARY

Depending on the program requested to be started, there may be managed conditions on the availability of communication with that terminal, such as the maximum number of communicable terminals, the time slot in which communication is permitted, or the geographical areas authorized as destinations of communication.

In related art, however, the server that accepts a program start request simply transmits as a response to that request a message indicating whether the requested program can be started. Where communication is not available between the program and the terminal that has requested the start of the program, the circumstances can be known only when communication is attempted between the program and the terminal in question. In this manner, there used to be futile communication taking place between the program requested to be started and the terminal that requested the start of the program when such communication was not available under the circumstances.

The present disclosure has been made in view of the above circumstances and provides a communication management apparatus, a terminal, a communication management system, a communication management method, a program, and an information storage medium for preventing futile communication from taking place between a program requested to be started and a terminal requesting the start of that program where communication therebetween is not available under the circumstances.

In carrying out the present disclosure and according to one embodiment thereof, there is provided a communication management apparatus including a start request acceptance unit configured to accept a request to start a program from a terminal; a query unit configured to query the program whether communication with the terminal is available upon acceptance of the start request; and a response transmission unit configured to transmit to the terminal, in response to the start request therefrom, a message indicating whether communication is available between the program and the terminal as a result of the query about the availability of communication therebetween.

According to another embodiment of the present disclosure, there is provided a terminal capable of communicating with a communication management apparatus, the terminal including a start request transmission unit configured to transmit a request to start a program to the communication management apparatus; a response reception unit configured to receive a message transmitted by the communication management apparatus as a response to the start request, the message indicating whether communication is available between the program and the terminal as a result of a query made by the communication management apparatus about the availability of communication therebetween; and a transmission control unit configured to control whether or not to transmit a process execution request to the program in response to the message.

According a further embodiment of the present disclosure, there is provided a communication management system including a communication management apparatus and a terminal. The terminal includes a start request transmission unit configured to transmit a request to start a program to the communication management apparatus. The communication management apparatus includes a start request acceptance unit configured to accept the start request from the terminal; a query unit configured to query the program whether communication is available with the terminal upon acceptance of the start request; and a response transmission unit configured to transmit to the terminal, in response to the start request therefrom, a message indicating whether communication is available between the program and the terminal as a result of the query about the availability of communication therebetween. The terminal further includes a response reception unit configured to receive the message transmitted as a response to the start request, and a transmission control unit configured to control whether or not to transmit a process execution request to the program in response to the message.

According to an even further embodiment of the present disclosure, there is provided a communication management method including accepting a request to start a program from a terminal; querying the program whether communication with the terminal is available upon acceptance of the start request; and transmitting to the terminal, in response to the start request therefrom, a message indicating whether communication is available between the program and the terminal as a result of the query about the availability of communication therebetween.

According to a still further embodiment of the present disclosure, there is provided a program for a computer, including accepting a request to start a program from a terminal; querying the program whether communication with the terminal is available upon acceptance of the start request; and transmitting to the terminal, in response to the start request therefrom, a message indicating whether communication is available between the program and the terminal as a result of the query about the availability of communication therebetween.

According to a yet further embodiment of the present disclosure, there is provided an information storage medium readable by a computer and storing a program for the computer, the program including accepting a request to start a program from a terminal; querying the program whether communication with the terminal is available upon acceptance of the start request; and transmitting to the terminal, in response to the start request therefrom, a message indicating whether communication is available between the program and the terminal as a result of the query about the availability of communication therebetween.

According to one embodiment of the present disclosure, a message is transmitted in response to a request to start a program from a terminal, the message indicating whether communication is available between the program and the terminal. The message allows the terminal to verify the availability of communication with the program and to perform control not to attempt futile communication with the program. This embodiment thus prevents futile communication from taking place between the program and the terminal having requested the start of the program where the communication therebetween is not available under the circumstances.

Preferably, upon transmitting to the terminal a message indicating permission to communicate with the terminal, the response transmission unit may relate to the message a port number used by the program.

Preferably, the communication management apparatus of the above embodiment may further include a start unit configured to start the program. The start unit may start the program if the program for which the start request has been accepted has yet to be started. The query unit may query the program started by the start unit whether communication is available with the terminal.

Preferably, upon start of the program, if a display apparatus to which an image generated by execution of the program is output remains switched off, the start unit may turn on power to the display apparatus.

Preferably, the communication management apparatus of the above embodiment may further include a location reception unit configured to receive, from the terminal, data indicative of the location of a moving image targeted to be reproduced and data indicative of the location of subtitles different from the location of the moving image, the subtitles being displayed along with the moving image; a moving image acquisition unit configured to acquire the moving image by accessing the location thereof; a subtitle acquisition unit configured to acquire the subtitles by accessing the location thereof; and a display control unit configured to display the subtitles on a display unit along with the moving image.

BRIEF DESCRIPTION OF THE DRAWINGS

Further objects and advantages of the present disclosure will become apparent upon a reading of the following description and appended drawings in which:

FIG. 4 is a diagram showing a subtitled moving image displayed typically on a display unit of the information processing terminal;

FIG. 7 is a tabular view showing typical relations between the result of a query reported by a target process on the one hand, and a message transmitted to the information processing terminal and indicative of the availability of communication between the program and the terminal on the other hand;

DETAILED DESCRIPTION OF THE PREFERRED EMBODIMENTS

Some preferred embodiments of the present disclosure are explained below in detail with reference to the accompanying drawings.

Figure 1:
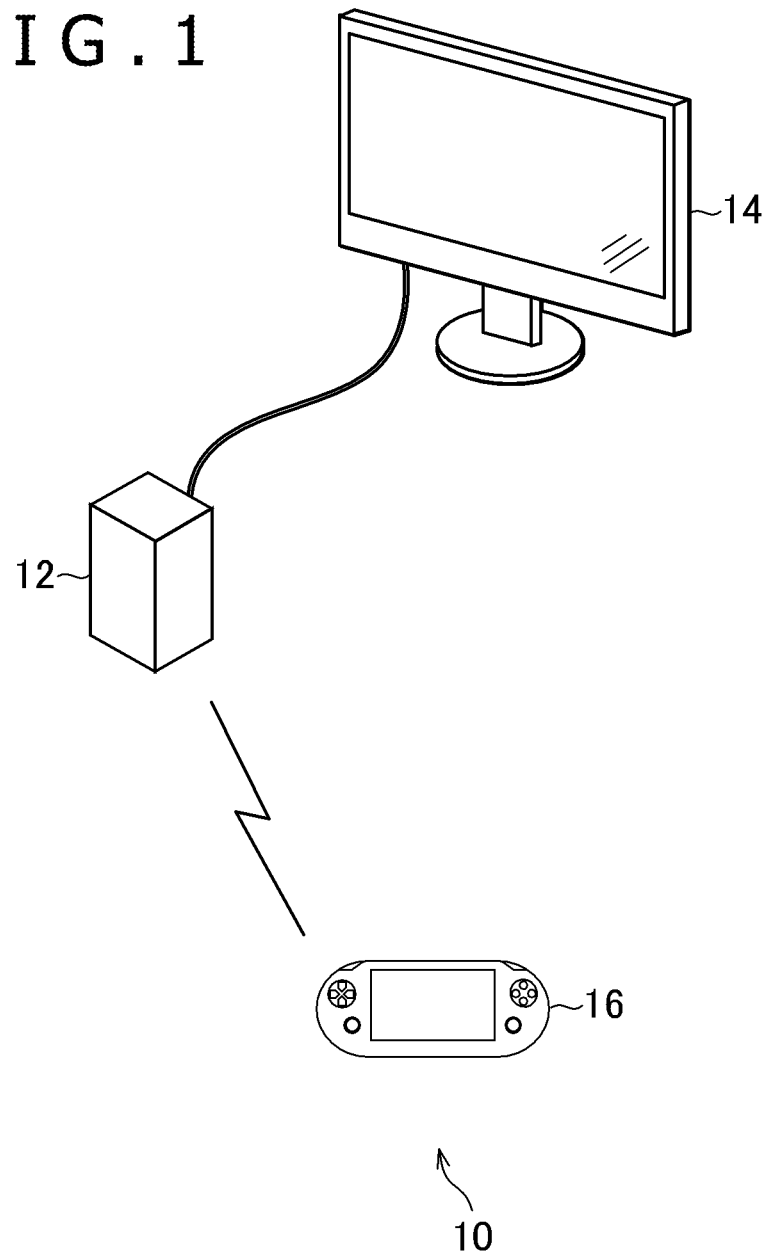
FIG. 1 is a diagram showing a typical overall configuration of an information processing system as one embodiment of the present disclosure.

FIG. 1 is a diagram showing a typical overall configuration of an information processing system 10 as one embodiment of the present disclosure. As shown in FIG. 1, the information processing system 10 embodying the present disclosure includes an information processing apparatus 12, a display device 14, and an information processing terminal 16.

Figure 2:
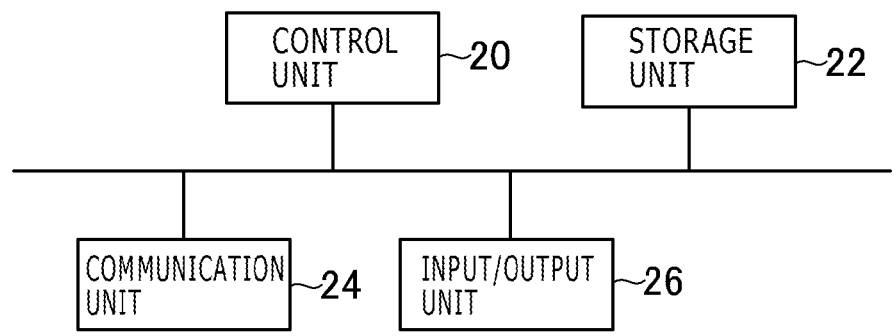
FIG. 2 is a diagram showing a typical hardware configuration of an information processing apparatus as one embodiment of the present disclosure.

The information processing apparatus 12 as one embodiment of the disclosure may be a computer such as a game console or a personal computer. For example, as shown in FIG. 2, the information processing apparatus 12 includes a control unit 20, a storage unit 22, a communication unit 24, and an input/output unit 26. The control unit 20 may be a program-controlled device such as the CPU (central processing unit) operating in accordance with programs installed in the information processing apparatus 12. The storage unit 22 may be a storage element such as a ROM (read-only memory) or a RAM (random-access memory), or a hard disk drive, for example. The programs to be executed by the control unit 20 and other resources are stored in the storage unit 22. The communication unit 24 may be a communication interface such as a network board or a wireless LAN (local area network) module. With this embodiment, it is assumed that the communication unit 24 remains turned on even when the information processing apparatus 12 is switched off, so that the communication unit 24 is ready to receive data transmitted from the information processing terminal 16. The input/output unit 26 is an input/output port such as an HDMI (High-Definition Multimedia Interface; registered trademark) port or a USB (universal serial bus) port.

The display device 14 of this embodiment may be a liquid crystal display, an organic EL (electroluminescence) display or the like. The display device 14 is assumed to incorporate speakers. With this embodiment, the information processing apparatus 12 and the display device 14 are interconnected via the input/output unit 26 using a cable such as an HDMI cable or a USB cable.

Figure 3:
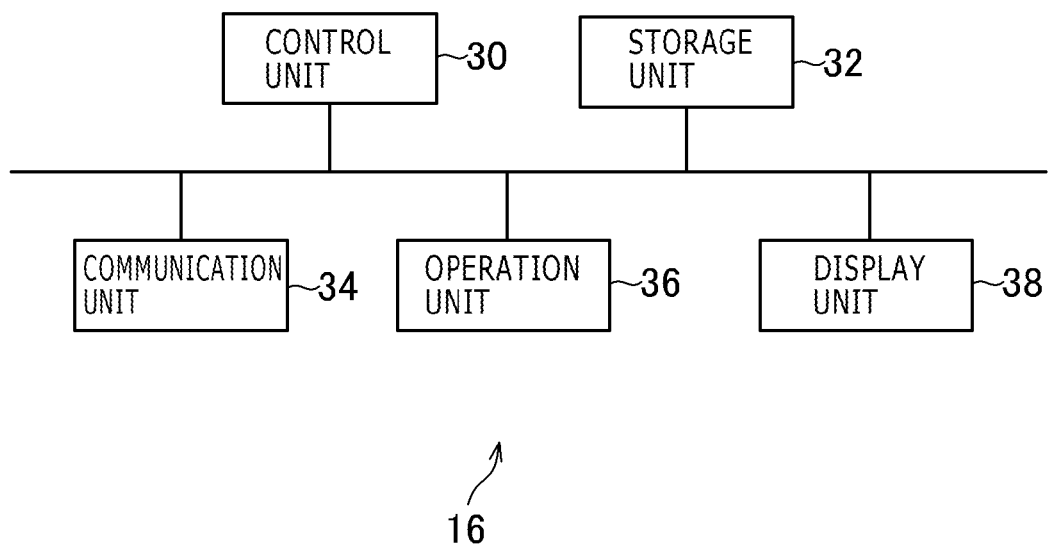
FIG. 3 is a diagram showing a typical hardware configuration of an information processing terminal as one embodiment of the present disclosure.

The information processing terminal 16 of this embodiment may be a computer such as a portable game machine, a mobile phone terminal, a smartphone, a tablet terminal, etc. For example, as shown in FIG. 3, the information processing terminal 16 includes a control unit 30, a storage unit 32, a communication unit 34, an operation unit 36, and a display unit 38. The control unit 30 may be a program-controlled device such as the CPU operating in accordance with programs installed in the information processing terminal 16. The storage unit 32 may be a storage element such as a ROM or a RAM, or a hard disk drive, for example. The programs to be executed by the control unit 30 and other resources are stored in the storage unit 32. The communication unit 34 may be a communication interface such as a network board or a wireless LAN module. The operation unit 36 is made up of operating members such as buttons, analog controllers, and touch sensors. The display unit 38 is a display apparatus such as a liquid crystal display or an organic EL display. With this embodiment, it is assumed that the screen size of the display unit 38 is smaller than that of the display device 14.

The information processing apparatus 12 and the information processing terminal 16 of this embodiment can communicate with one another in wired or wireless fashion. Further, the information processing apparatus 12 and the information processing terminal 16 are connected to a computer network such as the Internet so that they can access various sites on the Internet.

When the information processing terminal 16 of this embodiment executes a moving image reproduction program installed in the terminal 16, a moving image distribution site connected to the information processing terminal 16 can be accessed via the network. When a user performs operations to select a desired moving image from the moving image offerings distributed by the moving image distribution site, the selected moving image starts to be reproduced. FIG. 4 shows an example in which a moving image started in this manner is displayed on the display unit 38 of the information processing terminal 16.

Also with this embodiment, when the user selects a moving image, the moving image distribution site distributes to the information processing terminal 16 the selected moving image together with subtitle data representing one or multiple subtitles related to the moving image. In turn, the information processing terminal 16 causes the display unit 38 to display the subtitles along with the moving image as depicted in FIG. 4.

With this embodiment, each moving image and the subtitle data related thereto are managed by the moving image distribution site. However, the URL (uniform resource locator) indicating the location of a given moving image is different from the URL denoting the location of the subtitle data representing one or multiple subtitles related to that moving image. In the ensuing description, the URL indicating the location of the moving image will be called the moving image URL, and the URL denoting the location of the subtitle data representing one or multiple subtitles will be called the subtitle URL. Upon selection of the moving image, the information processing terminal 16 receives from the moving image distribution site the moving image URL and the subtitle URL of the subtitle data related to the selected moving image. The information processing terminal 16 then accesses the moving image URL to acquire the moving image from the moving image distribution site and accesses the subtitle URL to acquire the subtitle data also from the moving image distribution site. The information processing terminal 16 causes the display unit 38 to display the moving image as well as the subtitles represented by the subtitle data. Also with this embodiment, one or multiple subtitles represented by the subtitle data are each related to a timestamp. While the moving image is being reproduced, the subtitles related to the timestamps of currently displayed frame images are displayed along with the moving image. Thus with this embodiment, the moving image and the subtitles are displayed on the display unit 38 in a synchronized manner. The moving image related to the subtitle data as explained above will be called the subtitled moving image M hereunder.

Figure 5:
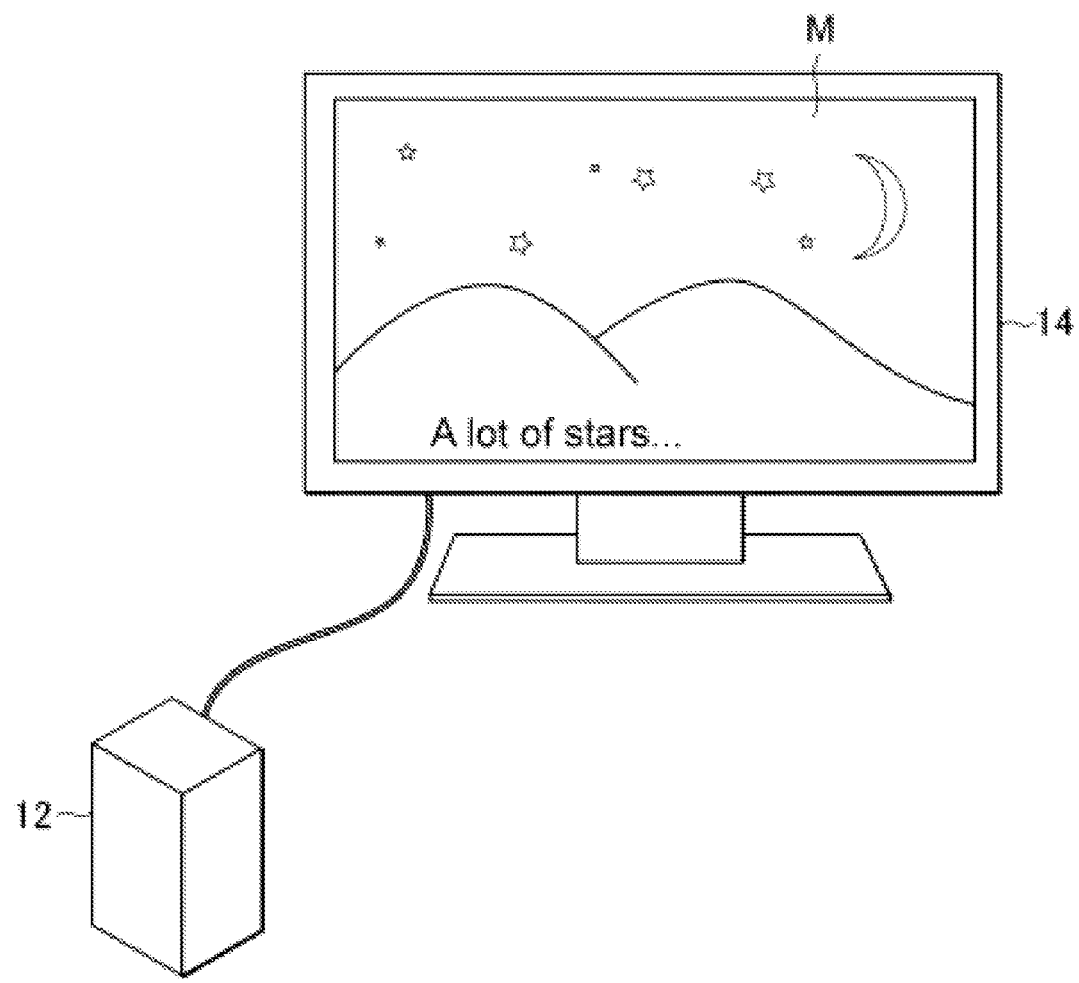
FIG. 5 is a diagram showing a subtitled moving image displayed typically on a display device.

Suppose now that the user, while viewing the subtitled moving image M on the information processing terminal 16, desires to watch the subtitled moving image M in magnified fashion on the display device 14. In such a case, the user may perform predetermined operations on the operation unit 36 such as the push of a predetermined button on the information processing terminal 16. This causes the subtitled moving image M to appear on the display device 14 as shown in FIG. 5.

According to this embodiment, when the information processing apparatus 12 executes the moving image reproduction program installed in the apparatus 12, the subtitled moving image M is displayed on the display device 14. With this embodiment, if the above-mentioned predetermined operations are carried out while the information processing apparatus 12 remains switched off, the information processing apparatus 12 is turned on at that point. Where the moving image reproduction program installed in the information processing apparatus 12 has yet to be started, that program is also started. When the display device 14 remains switched off, starting the moving image reproduction program turns on power to that display device 14. The display device 14 is then set for the channel on which the subtitled moving image M received from the information processing apparatus 12 is to be displayed.

According to this embodiment, the user need only perform predetermined operations such as the push of a specific button on the information processing terminal 16, and a series of processes necessary for displaying the subtitled moving image M on the display device 14 will be performed. With this embodiment, that series of processes includes the transmission of a request from the information processing terminal 16 to the information processing apparatus 12, the request requesting the start of the moving image reproduction program installed in the information processing apparatus 12. Explained below in reference to FIG. 6 is the transmission of the request to start a program installed in the information processing apparatus 12, as well as the processes executed in conjunction with that start request.

Figure 6:
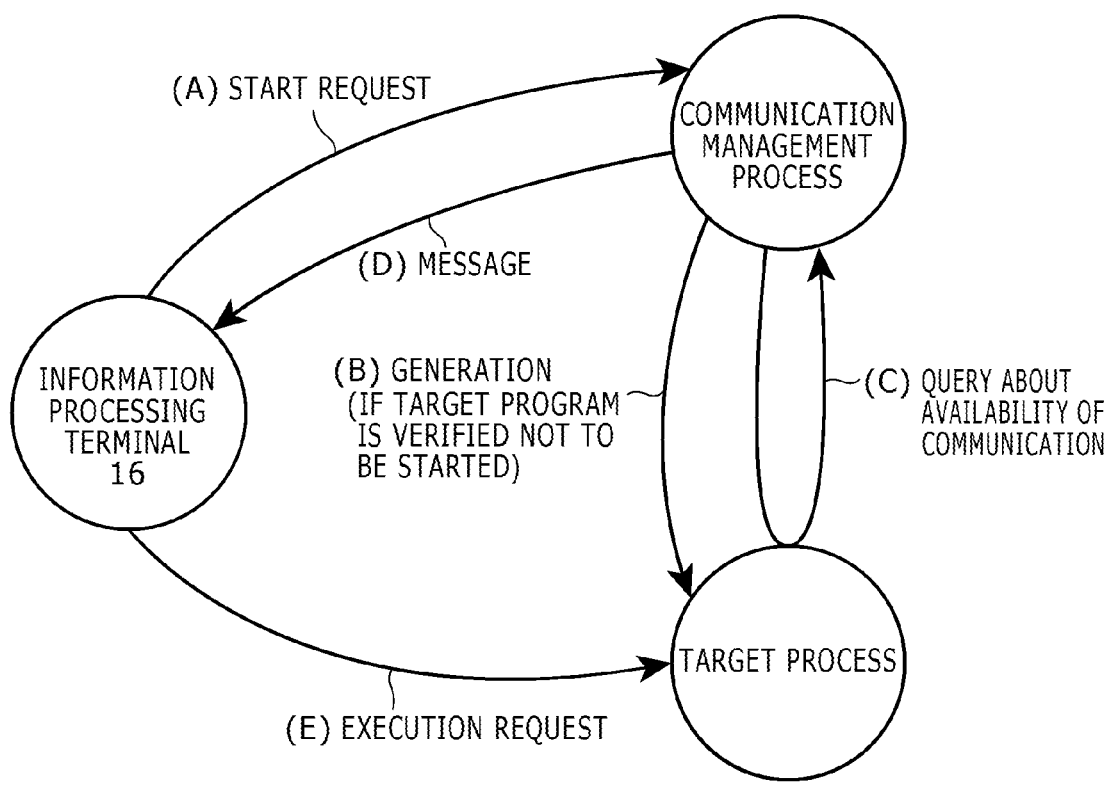
FIG. 6 is an explanatory drawing for explaining an example in which a program start request is issued and typical processes are performed in response to that request.

According to this embodiment, the information processing terminal 16 transmits a program start request to a communication management process being executed by the information processing apparatus 12 ((A) in FIG. 6). The communication management process is generated when a communication management program installed in the information processing apparatus 12 is started. With this embodiment, the communication management program, once started, functions as the communication management process being active on the information processing apparatus 12.

Upon acceptance of the start request, the communication management process queries whether the program of which the start has been requested is already active, i.e., whether the program in question has already been started. In the ensuing description, the program of which the start has been requested will be called the target program. If it is verified that the target program has yet to be started, the communication management process starts the target program, i.e., the communication management process generates the process corresponding to the target program ((B) in FIG. 6). The process thus generated will be called the target process hereunder.

The communication management process proceeds to query the target process whether communication is available with the information processing terminal 16 ((C) in FIG. 6). The communication management process then transmits to the information processing terminal 16, in response to the start request accepted therefrom, a message indicating whether communication is available between the target program and the information processing terminal 16 as the result of the query about the availability of communication therebetween ((D) in FIG. 6).

FIG. 7 shows typical relations between the result of the query reported by the target process (see (C) in FIG. 6) on the one hand, and the message transmitted to the information processing terminal 16 and indicative of the availability of communication between the target program and the information processing terminal 16 (see (D) in FIG. 6) on the other hand.

According to this embodiment, if communication with the information processing terminal 16 is available, the target process notifies the communication management process to that effect together with the port number of the information processing apparatus 12 used by the target process as the result of the query ((a) in FIG. 7). The port number serves as the destination via which the information processing terminal 16 transmits information to the target process. On the other hand, if communication with the information processing terminal 16 is not available, the target process notifies the communication management process to that effect as the result of the query ((b) in FIG. 7).

If notified that communication is available with the information processing terminal 16 as the result of the query, the communication management process transmits to the information processing terminal 16 a message related to the reported port number and indicating that communication with the terminal 16 is available. With this embodiment, there are two kinds of messages indicating that communication is available with the information processing terminal 16. One of the two kinds of messages is transmitted depending on whether the target process is generated upon acceptance of the start request. According to this embodiment, if the target process is generated upon acceptance of the start request, there is transmitted a message indicating that communication is available with the information processing terminal 16 and that the target process is generated ((c1) in FIG. 7). On the other hand, if the target process has already been generated at the time of accepting the start request, then there is transmitted a message indicating that communication is available with the information processing terminal 16 and that the target process has already been generated ((c2) in FIG. 7).

If notified that communication is not available with the information processing terminal 16 as the result of the query, the communication management process transmits to the information processing terminal 16 a message indicating that communication with the terminal 16 is not available ((d) in FIG. 7).

Upon receipt of the message indicating that communication is available between the target program and the information processing terminal 16, the information processing terminal 16 is ready to communicate with the target program. At this point, the information processing terminal 16 may transmit, say, a process execution request to the port number related to the message and thereby cause the target program to execute the process in question ((E) in FIG. 6).

Even where the target program is being active, the target program may be under conditions that prevent the program from communicating anew with the information processing terminal 16. Specifically, it may be the case that the target process is the moving image reproduction process generated when the moving image reproduction program is started and that this moving image reproduction process is set so as not to communicate with multiple information processing terminals 16 at the same time, for example. In this case, if the moving image reproduction process is already communicating with another information processing terminal 16, the process cannot communicate with the information processing terminal 16 that has transmitted the start request. In another example, it may be the case that the target process is a process in which up to a predetermined number of users can play a game simultaneously and that the maximum number of information processing terminals 16 are already communicating with that process. In this case, too, the process of the game in question cannot communicate with the information processing terminal 16 that has transmitted the start request.

According to this embodiment, as a response to the start request from the information processing terminal 16, the target program transmits to that information processing terminal 16 a message indicating the availability of communication with the terminal 16 that has transmitted the start request. Upon receipt of that message, the information processing terminal 16 can verify whether the target program is under conditions that permit communication with the terminal 16 in question. If it is verified that the target program is in a situation ready to communicate with the information processing terminal 16, that terminal 16 may transmit a process execution request to the target program and thereby allow the target program to execute the process of interest. On the other hand, if it is verified that the target program cannot communicate with the information processing terminal 16 under the circumstances, the terminal 16 can perform control not to initiate futile communication with the target program, e.g., the information processing terminal 16 may perform control not to transmit to the target process the request to start the execution that is bound to fail. In this manner, where the target program of which the start has been requested is under conditions preventing the program from communicating anew with the information processing terminal 16 that has made the start request, this embodiment can suppress the start of futile communication.

With this embodiment, as discussed above, the message indicating that communication is available with the information processing terminal 16 is related to the port number of the information processing apparatus 12 serving as the destination via which information is transmitted from the information processing terminal 16. For this reason, upon receipt of the message indicating that communication is available with the information processing terminal 16, the terminal 16 can recognize the port number of the destination via which the message addressed to the target process is transmitted. This eliminates the need for the terminal 16 to query the information processing apparatus 12 anew about the port number via which the process execution request and other requests are transmitted to the target process. This embodiment thus reduces the traffic of communication.

Also according to this embodiment, when the information processing terminal 16 transmits to the information processing apparatus 12 a request to terminate the target process, the information processing apparatus 12 terminates (cancels) the target process in question upon receipt of the termination request.

Explained below is the request to display, on the display device 14, the subtitled moving image M being displayed on the display unit 38 of the information processing terminal 16 as an example of the above-described request to execute the process (see (E) in FIG. 6). In this case, the target process is the moving image reproduction process generated when the moving image reproduction program is started.

With this embodiment, upon receiving the message indicating that communication is available between the moving image reproduction program and the information processing terminal 16, the terminal 16 transmits to the information processing apparatus 12 a request to display the subtitled moving image M being displayed on the display unit 38. At this point, the information processing terminal 16 transmits the display request to the port number of the information processing apparatus 12 used by the moving image reproduction process, the port number being related to the message received. Also with this embodiment, the display request is related to the moving image URL and subtitle URL regarding the subtitled moving image M.

The moving image reproduction process that has received the display request accesses the moving image URL related to that request to obtain the moving image. Also, the moving image reproduction process accesses the subtitle URL related to the display request to acquire the subtitle data. The moving image reproduction process then causes the display device 14 to display the subtitled moving image M based on the subtitle data and on the moving image.

According to this embodiment, the information processing terminal 16 can transmit to the information processing apparatus 12 both the moving image URL and the subtitle URL regarding the subtitled moving image M. Thus even where the moving image URL differs from the subtitle URL, the information processing apparatus 12 of this embodiment can display the subtitled moving image M on the display device 14.

What follows is a further explanation of the functions of the information processing apparatus 12 of this embodiment and the processes to be executed by the apparatus 12.

Figure 8:
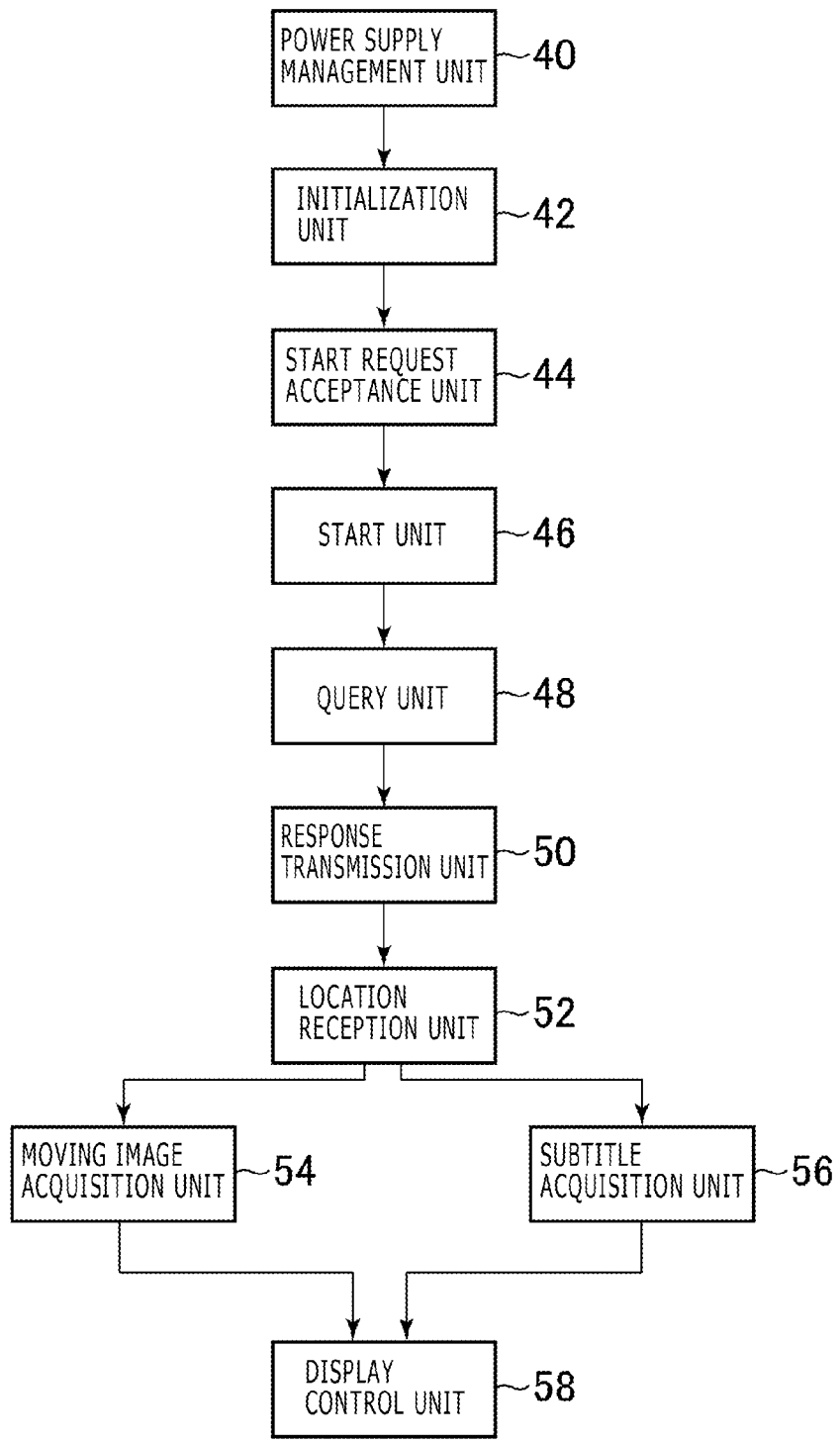
FIG. 8 is a functional block diagram showing typical functions to be implemented by the information processing apparatus as one embodiment of the present disclosure.

FIG. 8 is a functional block diagram showing typical functions to be implemented by the information processing apparatus 12 of this embodiment. It should be noted that not all functions shown in FIG. 8 need to be implemented by the information processing apparatus 12 of this embodiment and that functions other than those indicated in FIG. 8 may also be implemented by the apparatus 12.

As shown in FIG. 8, the information processing apparatus 12 of this embodiment functionally includes a power supply management unit 40, an initialization unit 42, a start request acceptance unit 44, a start unit 46, a query unit 48, a response transmission unit 50, a location reception unit 52, a moving image acquisition unit 54, a subtitle acquisition unit 56, and a display control unit 58. FIG. 8 depicts some of the functions implemented by the information processing apparatus 12 when the target process is the moving image reproduction process. According to this embodiment, the power supply management unit 40, start request acceptance unit 44, response transmission unit 50, location reception unit 52, moving image acquisition unit 54, and subtitle acquisition unit 56 are implemented in a manner centering on the communication unit 24. The start unit 46, query unit 48, and display control unit 58 are implemented in a manner centering on the control unit 20. The start request acceptance unit 44, start unit 46, query unit 48, and response transmission unit 50 correspond to the communication management process. The location reception unit 52, moving image acquisition unit 54, subtitle acquisition unit 56, and display control unit 58 correspond to the moving image reproduction process. As shown in FIG. 8, the information processing apparatus 12 plays the role of a communication management apparatus of this embodiment.

The above-mentioned functions are implemented when the control unit 20 executes a program which is installed in the information processing apparatus 12 (i.e., computer) and which includes the commands corresponding to these functions. Alternatively, the functions may be implemented using a plurality of programs that are different from one another. The program is supplied to the information processing apparatus 12 using computer-readable information storage media such as an optical disk, a magnetic disk, a magnetic tape, a magneto-optical disk or a flash memory, or via a computer network such as the Internet.

The power supply management unit 40 turns on power to the information processing apparatus 12 in response to a power-on request accepted from the information processing terminal 16. Since the communication unit 24 remains turned on even while power to the information processing apparatus 12 of this embodiment remains off as mentioned above, the power supply management unit 40 can accept the power-on request.

The initialization unit 42 performs processes necessary for initializing the information processing apparatus 12 when power to that apparatus 12 is turned on. Specifically, the initialization unit 42 may start the communication management program to generate the communication management process, for example.

The start request acceptance unit 44 accepts the request to start the target program from the information processing terminal 16.

Where the target program has yet to be started, the start unit 46 starts the target program. If it is verified that the target program is already active, i.e., that the target process is currently executed and if power to the display device 14 remains off at that point, the start unit 46 turns on power to the display device 14.

Upon acceptance of the request to start the target program, the query unit 48 queries the target program whether communication is available with the information processing terminal 16 that has transmitted the start request.

The response transmission unit 50 transmits to the information processing terminal 16 a message indicating whether communication is available between the target program and the information processing terminal 16 as a response to the start request from the terminal 16. Also, upon transmitting to the information processing terminal 16 a message indicating permission to communicate with the terminal 16, the response transmission unit 50 relates to this message the port number used by the target program.

The location reception unit 52 receives the moving image URL and the subtitle URL from the information processing terminal 16. With this embodiment, the request to display the subtitled moving image M is related to the moving image URL and the subtitle URL.

The moving image acquisition unit 54 accesses the moving image URL to obtain the moving image from the moving image distribution site.

The subtitle acquisition unit 56 accesses the subtitle URL to acquire the subtitle data from the moving image distribution site.

The display control unit 58 causes the display device 14 to display the obtained moving image along with the acquired subtitles.

Figure 9:
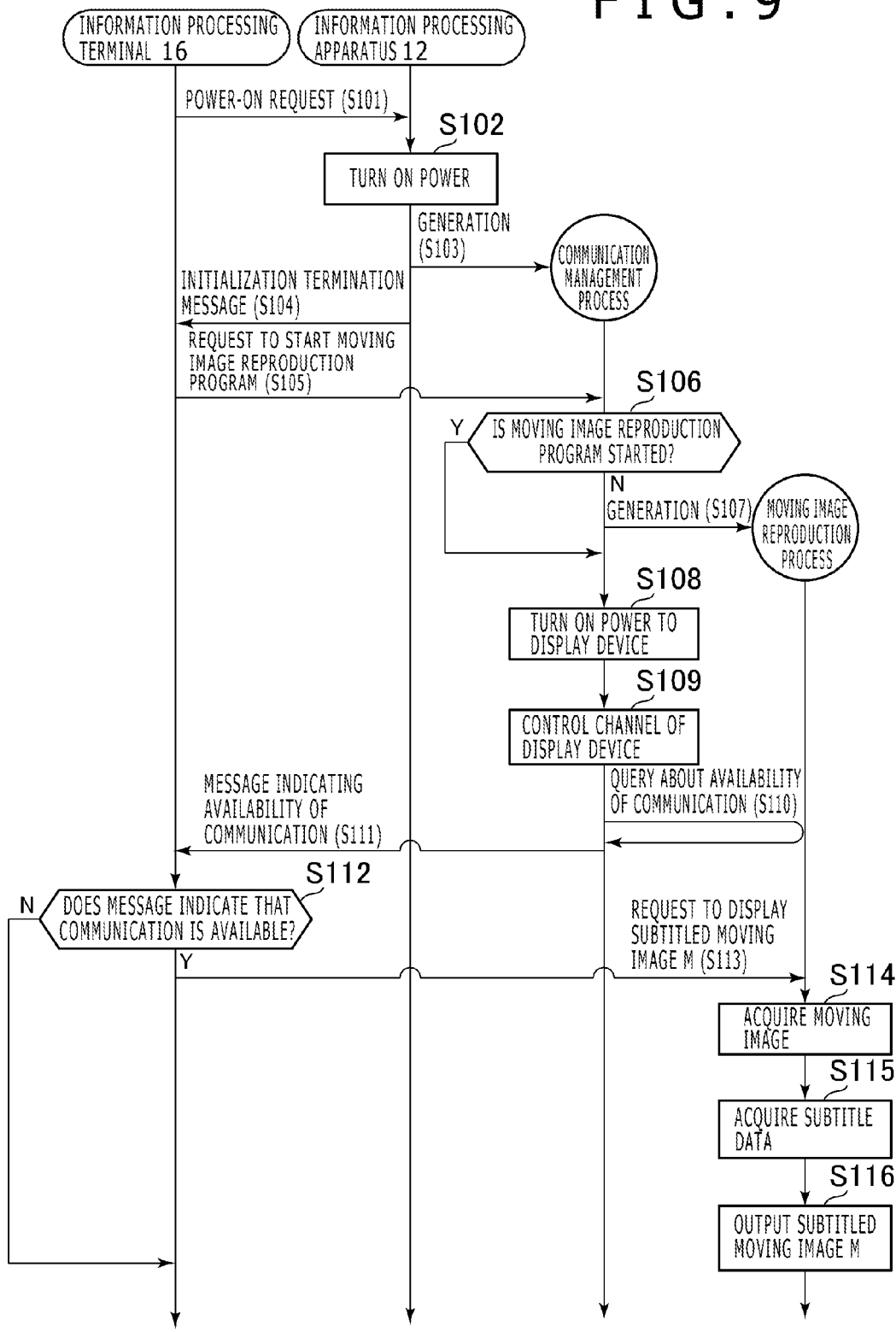
FIG. 9 is a flowchart showing a typical flow of processing performed by the information processing system as one embodiment of the present disclosure.

A typical flow of processing for displaying the subtitled moving image M on the display device 14 is explained below in reference to the flowchart of FIG. 9. It is assumed that upon start of the processing to be discussed below, the information processing apparatus 12 and the display device 14 are both switched off.

First, the user performs predetermined operations on the operation unit 36 of the information processing terminal 16. In turn, the information processing terminal 16 transmits a power-on request to the information processing apparatus 12. The information processing apparatus 12 accepts the power-on request (S101). The power supply management unit 40 then turns on power to the information processing apparatus 12 (S102). The initialization unit 42 generates the communication management process (S103). The initialization unit 42 then transmits to the information processing terminal 16 a message indicating that the processing necessary for initializing the information processing apparatus 12 is terminated, and the information processing terminal 16 receives the message (S104). This message is related to the port number used by the communication management process.

The information processing terminal 16 then transmits to the communication management process a request to start the moving image reproduction program. The start request acceptance unit 44 of the communication management process accepts the start request (S105). For example, the start request may be transmitted to the port number related to the message received in the processing of step S104.

The start unit 46 of the communication management process verifies whether the moving image reproduction program has been started (S106). If it is verified that the moving image reproduction program has yet to be started ("N" in S106), the start unit 46 of the communication management process starts the moving image reproduction program (S107). This generates the moving image reproduction process.

If it is verified that the moving image reproduction program has already been started ("Y" in S106), or after the processing of step S107 has ended, the start unit 46 of the communication management process turns on power to the display device 14 (S108). The start unit 46 of the communication management process proceeds to perform control so that the display device 14 may be set for the channel on which to display the subtitled moving image M accepted from the information processing apparatus 12 (S109).

The query unit 48 of the communication management process then queries the moving image reproduction process whether communication is available with the information processing terminal 16 that has transmitted the start request (S110). The response transmission unit 50 of the communication management process transmits to the information processing terminal 16 a message indicating the availability of communication reflecting the result of the query made in the processing of step S110, the message being a response to the start request made in step S105. The information processing terminal 16 receives the message (S111). At this point, as described above, the relations between the result of the query about the availability of communication in the processing of step S110 on the one hand, and the message transmitted in the processing of step S111 on the other hand, may be as described in FIG. 7 for example.

The information processing terminal 16 verifies whether the message received in the processing of step S111 indicates that communication is available between the moving image reproduction process and the information processing terminal 16 (S112). If it is verified that the message indicates that communication is not available ("N" in S112), the processing of this example is terminated. If it is verified that the message indicates that communication is available ("Y" in S112), the information processing terminal 16 transmits to the information processing apparatus 12 a request to display the subtitled moving image M. The location reception unit 52 of the moving image reproduction process receives the display request (S113). This display request is related to the moving image URL and the subtitle URL.

The moving image acquisition unit 54 of the moving image reproduction process accesses the moving image URL to obtain the moving image (S114). The subtitle acquisition unit 56 of the moving image reproduction process accesses the subtitle URL to acquire the subtitle data (S115). The display control unit 58 of the moving image reproduction process then outputs to the display device 14 (S116) the subtitled moving image M based on the subtitles represented by the subtitle data acquired in the processing of step S115 and on the moving image obtained in the processing of step S114, and terminates the processing of this example. Upon acceptance of the subtitled moving image M from the information processing apparatus 12, the display device 14 displays the subtitled moving image M in question.

In the above processing example, if the information processing apparatus 12 remains switched on upon receipt of the power-on request in step S101, the power supply management unit 40 carries out the process of transmitting a message indicating that power to the information processing apparatus 12 is already on, instead of performing the processing of steps S102 through S104. If the display device 14 is already turned on by the time the processing of step S108 is carried out, then the processing of step S108 will not be performed.

It is to be understood that while the present disclosure has been described in conjunction with specific embodiments, it is evident that many alternatives, modifications and variations will become apparent to those skilled in the art in light of the foregoing description.

For example, the subtitled moving image M may be displayed regardless of whether all the data involved is downloaded from the moving image distribution site preparatory to reproduction or the image is being streamed therefrom for reproduction. As another example, the subtitled moving image M stored in the information processing terminal 16 may be arranged to be displayed on the display device 14. In this case, the moving image URL and subtitle URL designate the location of the information processing terminal 16, so that the information processing apparatus 12 acquires the moving image and the subtitle data from the information processing terminal 16.

Furthermore, the information processing apparatus 12 may be arranged to incorporate the display device 14. The information processing apparatus 12 may be constituted by multiple housings. It is also to be understood that specific character strings found in the foregoing description or in the accompanying drawings are only examples and are not limitative of the present disclosure.

The present disclosure contains subject matter related to that disclosed in Japanese Priority Patent Application JP 2013-196950 filed in the Japan Patent Office on Sep. 24, 2013, the entire content of which is hereby incorporated by reference.

What is claimed is:

1. A communication management apparatus comprising:
a communication management program configured to generate a communication management process executable by an information processing apparatus,
wherein said communication management process accepts a request to start a program from a terminal, and, upon receiving said request, queries the program as to whether communication is available with the terminal,
wherein said program notifies said communication management process: as to whether communication with the terminal is available, and if so, the port number of the information processing apparatus through which said terminal can transmit information to the program,
wherein upon receiving notification that communication with the terminal is available, said communication management process transmits a two-part message to the terminal indicating: that communication with the program is available, and identifying said target port number,
wherein upon receiving notification that communication is not available, said communication management process transmits a message to the terminal indicating that communication with the program is not available, and
wherein in response to said two-part message said terminal transmits a process execution request comprising a request to display a subtitled moving image to the program via said port number thereby causing the program to execute said process, wherein the communication management program includes a start process that starts the program, if the program for which the start request has been accepted, has yet to be started, said communication management process queries the program started by the start process whether communication is available with the terminal, and, upon start of the program, if a display apparatus to which an image generated by execution of the program is output remains switched off, the start process turns on power to the display apparatus, and wherein said program comprises a moving image reproduction process, wherein when said program receives said request to display a subtitled moving image, said moving image reproduction process accesses a moving image URL related to said request to obtain the moving image, and also accesses a separate subtitle URL related to said request to acquire the subtitle data.

2. The communication management apparatus of claim 1, wherein once said subtitle data and moving image are acquired the subtitled moving image is displayed on a display.

3. The communication management apparatus of claim 1, wherein in response to said message said terminal stops trying to initiate communication with the program in order to avoid futile communication with the program.

4. A terminal capable of communicating with a communication management apparatus, the terminal comprising:

a start request transmission unit configured to transmit a request to start a program to the communication management apparatus;

a response reception unit configured to receive a message transmitted by the communication management apparatus as a response to the start request, and determine from the message as to whether communication is available between the program and the terminal as a result of a query made by the communication management apparatus about the availability of communication therebetween; and a transmission control unit configured to control whether or not to transmit a process execution request to the program in response to the message, wherein upon receiving notification that communication with the terminal is available, said communication management apparatus transmits a two-part message to the terminal indicating: that communication with the program is available, and identifying a port number through which said terminal can transmit information to the program; wherein in response to said two-part message the terminal transmits to the program via said port number a process execution request comprising a request to display a subtitled moving image; and wherein upon receiving notification that communication is not available, said communication management apparatus transmits a message to the terminal indicating that communication with the program is not available, wherein the communication management apparatus includes a start process that starts the program, if the program for which the start request has been accepted, has yet to be started, said communication management process Queries the program started by the start process whether communication is available with the terminal, and, upon start of the program, if a display apparatus to which an image generated by execution of the program is output remains switched off, the start process turns on power to the display apparatus, and wherein said program comprises a moving image reproduction process, wherein when said program receives said request to display a subtitled moving image, said moving image reproduction process accesses a moving image URL related to said request to obtain the moving image, and also accesses a separate subtitle URL related to said request to acquire the subtitle data.

5. A communication management system comprising:
a communication management apparatus; and
a terminal;
the communication management apparatus including a communication management program configured to generate a communication management process executable by an information processing apparatus, wherein said communication management process accepts a request to start a program from a terminal, and, upon receiving said request, queries the program as to whether communication is available with the terminal, wherein said program notifies said communication management process: as to whether communication with the terminal is available, and if so, the port number of the information processing apparatus through which said terminal can transmit information to the program, wherein upon receiving notification that communication with the terminal is available, said communication management process transmits a two-part message to the terminal indicating: that communication with the program is available, and identifying said target port number, wherein upon receiving notification that communication is not available, said communication management process transmits a message to the terminal indicating that communication with the program is not available, and wherein in response to said two-part message said terminal transmits a process execution request comprising a request to display a subtitled moving image to the program via said port number thereby causing the program to execute said process, wherein the communication management program includes a start process that starts the program, if the program for which the start request has been accepted, has yet to be started, said communication management process queries the program started by the start process whether communication is available with the terminal, and, upon start of the program, if a display apparatus to which an image generated by execution of the program is output remains switched off, the start process turns on power to the display apparatus, and wherein said program comprises a moving image reproduction process, wherein when said program receives said request to display a subtitled moving image, said moving image reproduction process accesses a moving image URL related to said request to obtain the moving image, and also accesses a separate subtitle URL related to said request to acquire the subtitle data.

6. A communication management method comprising:
accepting a request to start a program from a terminal;
querying the program as to whether communication between the terminal and the program is available upon acceptance of the start request; and
transmitting to the terminal, in response to the start request therefrom, a two-part message indicating: whether communication is available between the program and the terminal as a result of the query about the availability of communication therebetween, and the port number through which said terminal can transmit information to the program, upon receiving notification that communication is not available, transmitting a message to the terminal indicating that communication with the program is not available, when communication is available said terminal transmitting a process execution request comprising a request to display a subtitled moving image to the program via said port number in response to said two-part message thereby causing the program to execute said process, providing a start process that starts the program, if the program for which the start request has been accepted, has vet to be started, and Querying the program started by the start process whether communication is available with the terminal, and, upon start of the program, if a display apparatus to which an image generated by execution of the program is output remains switched off, the start process turns on power to the display apparatus, and wherein said program comprises a moving image reproduction process, wherein when said program receives said request to display a subtitled moving image, said moving image reproduction process accesses a moving image URL related to said request to obtain the moving image, and also accesses a separate subtitle URL related to said request to acquire the subtitle data.

7. A non-transitory computer readable medium configured to provide instructions to a computer, comprising:

accepting a request to start a program from a terminal;

querying the program as to whether communication between the terminal and the program is available upon acceptance of the start request; and transmitting to the terminal, in response to the start request therefrom, a two-part message indicating: whether communication is available between the program and the terminal as a result of the query about the availability of communication therebetween, and the port number through which said terminal can transmit information to the program, upon receiving notification that communication is not available, transmitting a message to the terminal indicating that communication with the program is not available, when communication is available said terminal transmitting a process execution request comprising a request to display a subtitled moving image to the program via said port number in response to said two-part message thereby causing the program to execute said process, providing a start process that starts the program, if the program for which the start request has been accepted, has vet to be started, and querying the program started by the start process whether communication is available with the terminal, and, upon start of the program, if a display apparatus to which an image generated by execution of the program is output remains switched off, the start process turns on power to the display apparatus, and wherein said program comprises a moving image reproduction process, wherein when said program receives said request to display a subtitled moving image, said moving image reproduction process accesses a moving image URL related to said request to obtain the moving image, and also accesses a separate subtitle URL related to said request to acquire the subtitle data.

* * * * *